United States Patent [19]
Harada et al.

[11] Patent Number: 5,821,008
[45] Date of Patent: Oct. 13, 1998

[54] BATTERY PROVIDED WITH EXPLOSION-PROOF COMPONENTS

[75] Inventors: Yoshiro Harada; Masanori Nakanishi; Hidenori Nagura; Takuji Ogawa; Masahiro Tamai; Keiji Fukuhara; Masatake Nishio; Tomoya Murata, all of Shizuoka, Japan

[73] Assignee: FDK Corporation, Tokyo, Japan

[21] Appl. No.: 726,198

[22] Filed: Oct. 4, 1996

[30] Foreign Application Priority Data

Feb. 16, 1996 [JP] Japan .................................. 8-028887

[51] Int. Cl.⁶ ...................................... H01M 2/12
[52] U.S. Cl. ................................. 429/56; 429/61
[58] Field of Search ................... 429/53, 56, 61

[56] References Cited

U.S. PATENT DOCUMENTS

| 5,418,082 | 5/1995 | Taki et al. ............................ 429/61 X |
| 5,427,875 | 6/1995 | Yamamoto et al. .................. 429/53 X |
| 5,464,705 | 11/1995 | Wainwright .......................... 429/61 |
| 5,609,972 | 3/1997 | Kaschmitter et al. ................ 429/56 |

FOREIGN PATENT DOCUMENTS

| 0 689 255 | 12/1995 | European Pat. Off. . |
| 2-112151 | 4/1990 | Japan . |
| 2-288063 | 11/1990 | Japan . |
| 5-343043 | 12/1993 | Japan . |
| 6-96803 | 4/1994 | Japan . |
| 6-140011 | 5/1994 | Japan . |
| 6-196140 | 7/1994 | Japan . |
| 6-196150 | 7/1994 | Japan . |
| 6-203818 | 7/1994 | Japan . |
| 6-215747 | 8/1994 | Japan . |

*Primary Examiner*—Stephen Kalafut
*Attorney, Agent, or Firm*—Wenderoth, Lind & Ponack, LLP

[57] ABSTRACT

An explosion-proof battery includes a cover unit fit into an open portion of a cylindrical cup-like casing. The cover unit is electrically connected to a lead tab extended from an electricity generating unit installed in the casing. The cover unit includes a metal terminal plate of relatively high rigidity, a pressure sensitive plate in the form of a metal plate having relatively high flexibility and vulnerability, a fixing plate of insulating material, an electrical conductive member including an upwardly projecting portion and a base portion, and a ring-shaped gasket of insulating material. The terminal plate and the fixing plate have respective vent holes. The electrical conductive member and the pressure sensitive plate are connected to each other at a connecting portion on the projecting portion of the conductive member by welding. A tip end portion of the lead tab is connected to the base portion of the conductive member. When the pressure sensitive plate expands outwardly due to an extreme increase of the inner pressure, the conductive member is pulled upwardly with the pressure sensitive plate in the vicinity of the connecting portion thereof and is broken to cut off the current path between the lead tab and the terminal plate.

13 Claims, 6 Drawing Sheets

BATTERY PROVIDED WITH EXPLOSION-PROOF COMPONENTS

BACKGROUND OF THE INVENTION

1. Field of the Invention

The present invention generally relates to an explosion-proof battery, more specifically to an explosion-proof technology to be applied to high energy density batteries such as lithium secondary batteries.

2. Background Art

Typical high energy batteries are generally furnished with an explosion-proof device, which includes (1) an inner pressure releasing function, (2) a current cut-off function by sensing inner pressure, and (3) a current cut-off function by sensing temperature rise. The inner pressure releasing function prevents explosion of a battery by releasing confined gas in a battery casing when the inner pressure of the battery casing extraordinarily increases. The current cut-off function by sensing inner pressure prevents unusual charging or discharging by cutting off the charging or discharging current in a battery when inner pressure of the battery casing extraordinarily increases. The current cut-off function by sensing temperature rise also prevents unusual charging or discharging by choking the charging or discharging current by rapidly increasing the inner resistance of a battery when the inner temperature of the battery extraordinarily rises.

Many lithium secondary batteries having high energy density are provided with the current cut-off function by sensing inner pressure and the current cut-off function by sensing temperature rise, as well as the inner pressure releasing function. In such extraordinary conditions as short circuiting or overcharging, the batteries are so designed that the pressure sensing function discontinues charging or discharging and the pressure release function works for releasing confined gas. When designing this type of batteries, it is very important to provide a highly precise and reliable explosion-proof function with the smallest possible number of construction operations and with high productivity, and to reduce the manufacturing cost of the same.

Construction of a typical battery having the inner pressure releasing function and the inner pressure sensing function is disclosed in Japanese Patent Laid-open Publication No. 2-288063. The disclosed battery basically has a metal casing with a closed bottom portion, a generating component installed therein, and a cover unit for covering an opening of the casing, the cover unit including devices for the inner pressure releasing and the inner pressure sensing functions. The cover unit comprises an external terminal plate with a vent hole, an inserted pressure sensing plate having a thin metal plate with high flexibility and vulnerability, and an insulation plate called a "lead stripper". The pressure sensing plate receives the inner pressure in the casing for the pressure sensing function. As the inner pressure in the casing increases, the pressure sensing plate is extended outwardly and finally breaks on application of an inner pressure greater than a predetermined design value to release the gas confined in the casing.

A lead tab connected to one electrode of the generating component is welded to a central projecting portion of the pressure sensing plate through a small hole. When an unusual rise in the inner pressure in the battery casing is detected, the inserted pressure sensing plate is deformed by expanding outwardly and connection between the lead tab and the pressure sensing plate is broken to cut off a current path leading to the external terminal plate.

According to the such arrangement components of the cover unit, the inserted pressure sensing plate and the insulation plate are temporarily assembled using an intermediate inserter. This configuration was employed to make an ultrasonic welding step for connecting the lead tab and the pressure sensing plate easier and more precise. This configuration further resulted in simplification of assembly of the cover unit and installation thereof in the battery casing. However, there remained some shortcomings in productivity and accuracy in assembly.

Firstly, the step of assembly of the cover unit after welding of the lead tab to the pressure sensing plate is extremely troublesome. This is because the assembly step comprises the following sub-steps of: drawing out of the battery casing the lead tab which is connected to one of the electrodes of the generating component installed in the battery casing; welding the lead tab to the pressure sensing plate temporarily assembled with the intermediate inserter; placing the external terminal plate on the upper surface of the pressure sensing plate which is connected to the battery casing via the lead tab; caulking or deforming the outer peripheral portion of the pressure sensing plate to be integrally fastened to the external terminal plate; and fitting a sealing gasket around the outer periphery of the assembled cover unit. The above assembly operation as a whole is hard for workers to perform and makes it difficult to improve productivity.

Secondly, it is awkward to perform the steps of inserting the central projecting portion of the pressure sensing plate into a small hole of the insulating plate and welding the lead tab to the projecting portion via the hole. It is also difficult to improve accuracy of assembly in the above steps. Moreover, since mechanical stress is applied to the portion of the pressure sensing plate to which the lead tab is welded during the caulking step, a weld joint between the lead tab and the pressure sensing plate is possibly destroyed. This will lead to instability of strength of the weld joint.

Furthermore, because the lead tab is a ribbon-shaped flexible strip approximately 3 mm wide, the lead tab is sometimes pulled into the hole of the intermediate inserter along with deformation of the pressure sensing plate upon increase of the inner pressure in the battery. This will result in the phenomenon that the weld joint is not broken even when the inner pressure reaches a predetermined value. The above described possible deficiencies may cause degradation of accuracy of operation of the current cut-off function by sensing pressure increase and reliability of the device.

One proposal for compensating for the above deficiencies is an explosion-proof battery disclosed in Japanese Patent Laid-open Publication No. 5-343043. This explosion-proof battery includes the following modifications:

The insulation plate is replaced with a metal plate.
Only vent holes are provided in the metal plate for releasing gas and the small hole for welding the lead tab is eliminated.
On the upper surface of the metal plate is welded the central projecting portion of the pressure sensing plate and the lead tab is welded to the lower surface of the metal plate.

Strength of the weld joint between the central projecting portion of the pressure sensing plate and the metal plate is set at a predetermined value. When the pressure in the battery casing increases and the pressure sensing plate is deformed to expand outwardly, the weld joint between the central projecting portion of the pressure sensing plate and the metal plate is destroyed at the predetermined strength of the joint to cut off the current path to the external terminal plate.

The explosion-proof battery of the above construction made it possible to dispense with the assembly step of assembly of the cover unit after welding the lead tab to the pressure sensing plate and operations of inserting the central projecting portion of the pressure sensing plate into a small hole of the insulating plate and welding the lead tab to the projecting portion therethrough. Thus, the disclosure in the above reference contends that operation accuracy and reliability of the current cut-off function by sensing the inner pressure can be improved.

However, the operational accuracy and reliability of the current cut-off function by sensing the inner pressure according to the battery of the above reference does not seem to be satisfactory. When the inner pressure of the battery increases, timing of breaking of the weld joint between the central projecting portion of the pressure sensing plate and the metal plate depends on the predetermined strength of the weld joint. In this respect, it seems very difficult to determine with satisfactory accuracy the precise strength of the weld joint so that the current path is cut off at the designed critical inner pressure of the battery. As a result, it is almost impossible to maintain required operational accuracy of the current cut-off function to obtain sufficient reliability according to the above mentioned explosion-proof battery.

Accordingly, a welding operation for obtaining a welding joint of a designed mechanical strength so that the welded portion breaks at the predetermined inner pressure of the battery is awkward and difficult to reproduce. This will detract from the advantage of efficiency of assembly of the battery. On the other hand, the need for high accuracy of the strength of the welding joint may cause reduction of productivity.

SUMMARY OF THE INVENTION

One object of the present invention is to provide an explosion-proof battery having explosion-proof functions with an improved operational accuracy and reliability.

Another object of the present invention is to provide an explosion-proof battery having a simpler structure and providing better efficiency of assembly at high productivity.

According to one aspect of the present invention, an explosion-proof battery comprises a hollow cylindrical casing having a closed bottom portion, an electricity generating unit installed therein, a lead tab connected to one electrode of the generating unit, and a cover unit for covering an open portion of the casing, the cover unit being electrically connected to the lead tab. The cover unit includes a metal terminal plate of relatively high rigidity, a pressure sensitive plate in the form of a metal plate having relatively high flexibility and vulnerability, a fixing plate of insulating material, an electrically conductive member including an upwardly projecting portion and a base portion, and a ring-shaped gasket of insulating material. The terminal plate and the fixing plate have respective vent holes. An upper surface of the projecting portion is disposed on the upper surface side of the fixing plate, and a lower surface of the base portion is disposed at the lower surface side of the fixing plate. The ring-shaped gasket is inserted into an inner peripheral portion of the open portion of the casing, the fixing plate is fit into an inner periphery of the gasket, and the pressure sensitive plate and the terminal plate are placed on the fixing plate in order. The electrically conductive member and the pressure sensitive plate are connected to each other at a connecting portion of the projecting portion of the conductive member. A tip end portion of the lead tab is connected to the base portion of the conductive member. The open portion of the casing is deformed or caulked inwardly in a radial direction of a cross section of the casing to compress the gasket to seal the casing with the cover unit. Outward expansion of the pressure sensitive plate breaks the conductive member in the vicinity of the connecting portion thereof in order to cut off the current path between the lead tab and the terminal plate when the pressure in the casing reaches a predetermined value.

According to another aspect of the present invention, an explosion-proof battery comprises a hollow cylindrical casing having a closed bottom portion, an electricity generating unit installed therein, a lead tab connected to one electrode of the generating unit, and a cover unit for covering an open portion of the casing, the cover unit being electrically connected to the lead tab. The cover unit includes a metal terminal plate of relatively high rigidity, a pressure sensitive plate in the form of a metal plate having relatively high flexibility and vulnerability, an electrically conductive member including an upwardly projecting portion and a base portion, and a gasket plate of insulating material, and having an outer peripheral portion extending upwardly, the terminal plate and the gasket plate have respective vent holes. An upper surface of the projecting portion is disposed on the upper surface side of the gasket plate, and a lower surface of the base portion is disposed at the lower surface side of the gasket plate. The gasket plate is fit into an inner peripheral portion of the open portion of the casing, and the pressure sensitive plate and the terminal plate are placed on the gasket plate in order. The electrically conductive member and the pressure sensitive plate are connected each other at a connecting portion of the projecting portion of the conductive member. A tip end portion of the lead tab is connected to the base portion of the conductive member. The open portion of the casing is deformed caulked inwardly in a radial direction of a cross section of the casing to compress the gasket plate to seal the casing with the cover unit. Outward expansion of the pressure sensitive plate breaks the conductive member in the vicinity of the connecting portion thereof in order to cut off the current path between the lead tab and the terminal plate when the pressure in the casing reaches a predetermined value.

The conductive member may be integrally arranged in the fixing plate or in the gasket plate.

It is preferable that a retaining ring is disposed along the outer periphery of the gasket so that a lower end peripheral portion of the gasket is pressed to the fixing plate thereby.

The projecting portion of the conductive member may be formed in a shape of a truncated cone.

The projecting portion of the conductive member may be defined as a U-shaped folded portion.

The fixing plate and the gasket plate are preferably formed of plastic material, having a deflection temperature under load of not less than 200° C.

Other features and advantages of the present invention will become apparent in light of the following detailed description of the best mode to carry out the invention and in the accompanying drawings.

DESCRIPTION OF PREFERRED EMBODIMENTS

Figure 1:
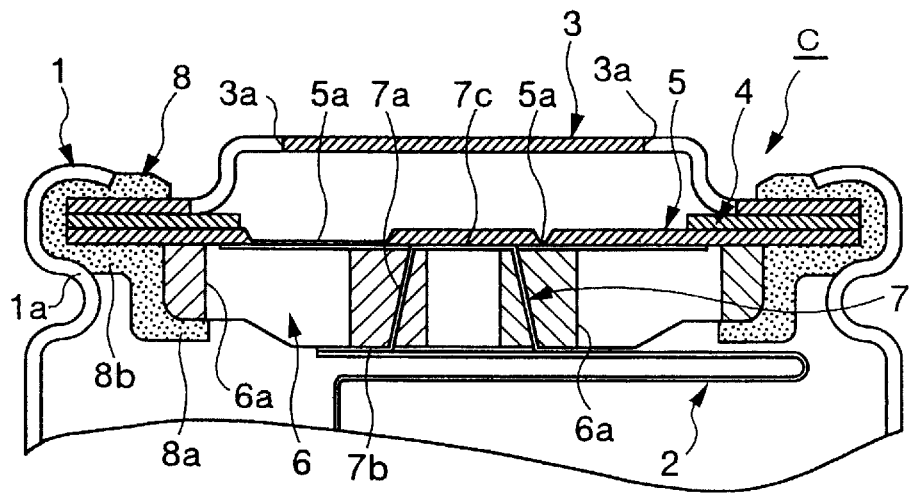
FIG. 1 is a partial cross-sectional view of the explosion-proof battery according to one embodiment of the present invention.

FIG. 1 is a partial cross-sectional view showing a structure of an explosion-proof battery including a current cut-off function by sensing temperature rise according to one embodiment of the present invention. The battery basically comprises a metal casing 1 with a closed bottom portion, an electricity generating unit (not shown) installed in the casing 1, a lead tab 2 connected to one of the electrodes of the generating unit, and a cover unit C electrically connected to the lead tab 2 for sealing the open end of the casing 1.

Figure 3:
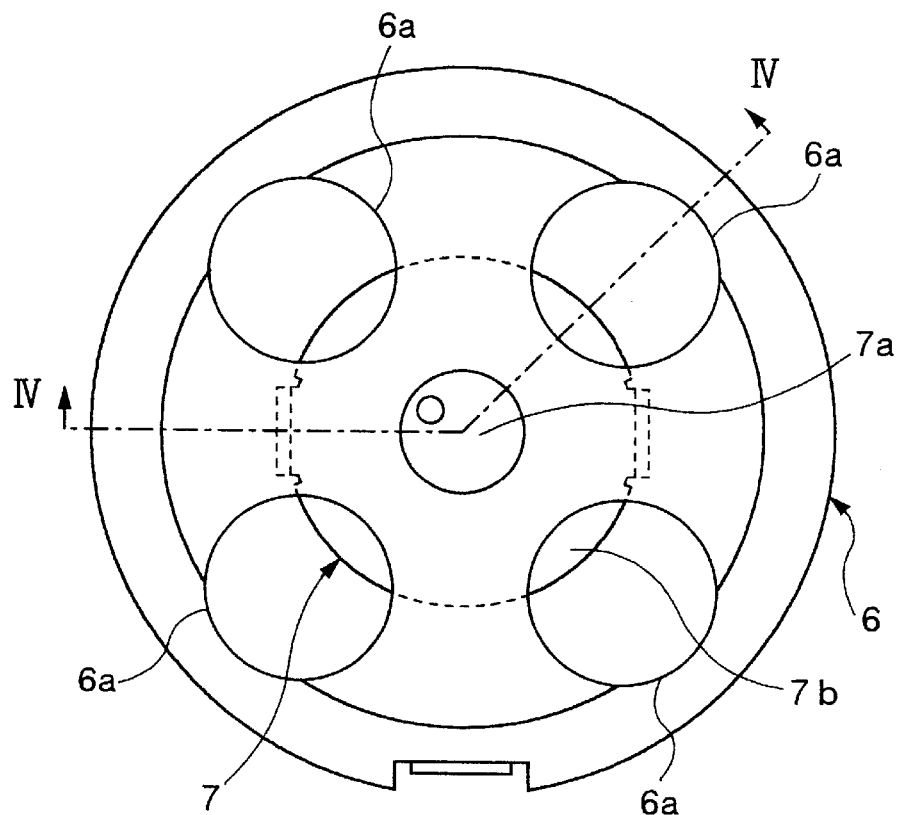
FIG. 3 is a top plan view of a fixing plate assembly according to one embodiment of the present invention.
Figure 4:
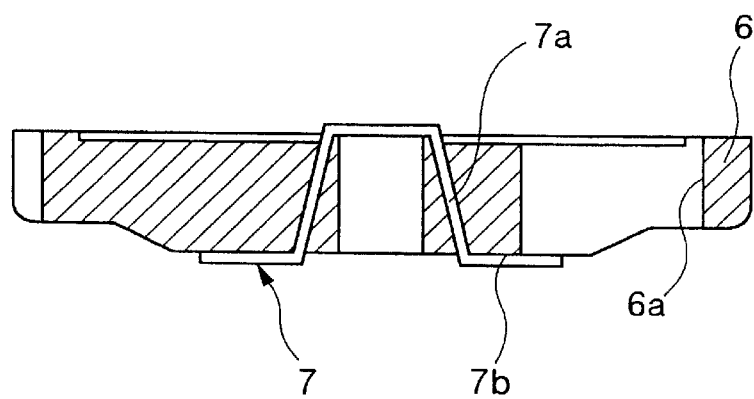
FIG. 4 is a longitudinal cross-sectional view of the fixing plate assembly.

The cover unit C has a terminal plate 3 formed of metal material with relatively high rigidity, a positive temperature coefficient resistor element (hereinafter referred to as a PTC element) 4 having a ring shape, an inserted pressure sensing plate 5 in the form of a flexible metal plate, a fixing plate 6 of insulating material, an electrically conductive member 7 including an upwardly projecting portion 7a and a base portion (a rim portion) 7b, and a ring-shaped gasket 8. In the terminal plate 3 and the fixing plate 6 are formed a plurality of vent holes 3a, 6a, respectively. A thin portion 5a is formed in the inserted pressure sensing plate 5 so as to be broken when a predetermined inner pressure is applied thereto. The conductive member 7 comprises the projecting portion 7a formed by protruding a central portion of a round plate to have a truncated cone shape and the base portion 7b surrounding the projecting portion 7a. As illustrated in FIGS. 3 and 4, the conductive member 7 is integrally molded in the fixing plate 6 by insert molding. The projecting portion 7a is positioned on an upper surface of the fixing plate 6 and the base portion 7b is positioned on a lower surface of the fixing plate 6.

The gasket 8 includes an inwardly projecting ring portion 8a and a step portion 8b for supporting the fixing plate 6 and the inserted pressure sensing plate 5, respectively.

In assembling the cover unit C into the open portion of the casing 1, first, the conductive member 7 molded in the fixing plate 6 and the inserted pressure sensing plate 5 are fixed to each other beforehand by ultrasonic welding. A part of an upper surface of the projecting portion 7a of the conductive member 7 is welded to a central portion of a lower surface of the inserted pressure sensing plate 5 to form a weld joint 7c. Weld joint 7c should be of sufficient strength so that the weld joint 7c will not break even when the pressure sensing plate 5 deforms.

A rim portion 1a is formed along the inner periphery of the open portion of the casing 1, and is an inwardly and circumferentially protruding portion formed by beading. The gasket 8 is inserted into and fit on the rim portion 1a of the casing 1.

The lead tab 2 is connected to a lower surface of the base portion 7b of the conductive member 7 by ultrasonic welding. The fixing plate 6 is fit into an opening of the gasket 8 so that the fixing plate 6 is pressed onto an upper surface of the inwardly projecting ring portion 8a. The pressure sensing plate 5 is also inserted into the opening of the gasket 8 and is pressed onto an upper surface of the step portion 8b.

Subsequently, the PTC element 4 and the terminal plate 3 are placed into the gasket 8 in order. The casing 1 is finally sealed by chalking or deforming the open portion of the casing 1 inwardly to compress the gasket 8.

When caulking the open portion of the casing 1, a compressive force should be applied in an axial direction of the casing 1 and not in a radial direction of the same so that harmful mechanical stress is not applied to the weld joint 7c between the pressure sensing plate 5 and the conductive member 7. By this procedure, uniform strength of the weld joint 7c can be obtained and operational characteristics of the current cut-off function by sensing inner pressure become stabilized.

One of the electrodes of the electricity generating unit is connected to the conductive member 7 via the lead tab 2. The conductive member 7 is further connected to the inserted pressure sensing plate 5 at the weld joint 7c on the upper surface of the projecting portion 7a. The pressure sensing plate 5 is joined to the terminal plate 3 via the PTC element 4. The terminal plate 3 is connected to an external load circuit.

Figure 2:
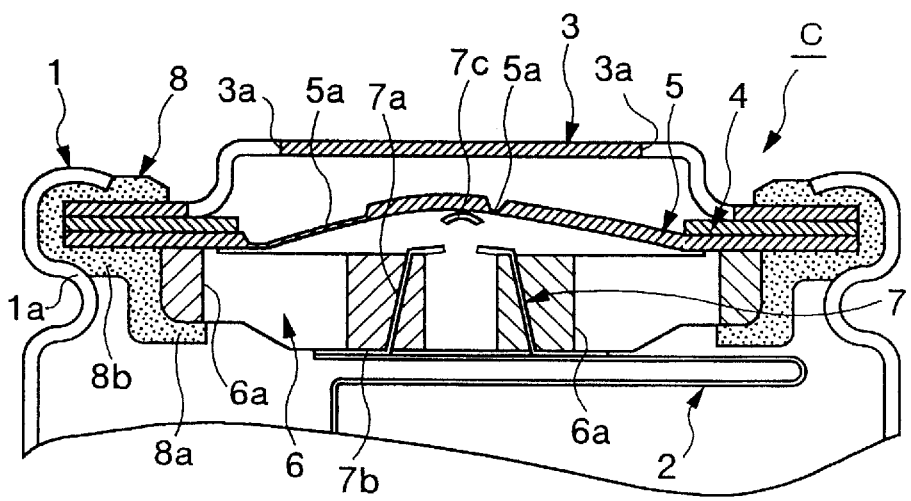
FIG. 2 is a partial cross-sectional view of the explosion-proof battery of FIG. 1 after explosion-proof operation of the same.

In the case that gas emerges in the casing I due to such malfunctions as overcharge or excessive discharge while using the battery having the above construction, the gas pressure is applied to the pressure sensing plate 5 via the vent holes 6a provided in the fixing plate 6. As shown in FIG. 2, an extraordinary rise in inner pressure of the battery causes the pressure sensing plate 5 to deform by expanding outwardly and to break the conductive member 7 at a portion thereof surrounding weld joint 7c. This leads to cut-off of a charging or discharging circuit connected to the terminal plate 3.

Further deformation of the pressure sensing plate 5 finally breaks the thinner portion 5a thereof to release the confined gas in the casing 1. When an extreme current flows through the external circuit due to a short circuit and the temperature of the battery rises unusually, a resistance of the PTC element 4, inserted in the charging or discharging circuit connected to the terminal plate 3, increases to limit the charging or discharging current in the circuit. The construction excluding the PTC element 4 will provide an explosion-proof function without a current cut-off function using temperature sensing.

In the present embodiment, since the portion of the conductive member 7 surrounding the weld joint 7c is to be broken instead of the weld joint 7c itself, it is not necessary to determine the strength of the weld joint 7c accurately. Alternatively, the weld joint 7c is merely required to have a predetermined strength necessary to avoid unexpected destruction. In other words, accuracy of the current cut-off function depends on such parameters as the material, the size and shape of the conductive member 7. Thus it is possible to determine an accurate and reliable inner pressure value for cutting off the load current when designing the battery. Precise control of the strength of the weld joint 7c during the manufacturing process is not necessary. This results in a more reliable current cut-off function for an unusual inner pressure rise and a safer battery having the same function. In the meantime, there is no need for precise welding operations to obtain a precise strength of the weld joint and the manufacturing process can be simplified and productivity is improved.

Function Tests of the Batteries according to the Present Embodiment

In order to confirm the characteristics of the battery of the present embodiment for the current cut-off function by sensing inner pressure, the current cut-off pressure of the battery was measured for the inner pressure. As comparative examples, batteries according to Japanese Patent Laid-open Publication No. 5-343043 were employed.

1. Cut-off Pressure Characteristics

Pressure measurement equipment include a thermostatic chamber, a pressurizing pump, and a tester such as a resistance detector. The thermostatic chamber stores the battery to be examined and keeps the inside temperature, that is the temperature of the fixing plate 6, constant. The pressurizing pump applies a predetermined pressure to the inside of the battery via a pipe extended into the battery from the pump. A pressure gauge is provided oil the pipe for measuring the pressure applied in the battery by the pump. Input terminals of the tester are connected to the terminal plate 3 and the conductive member 7, respectively so as to monitor the conductive state therebetween and to determine the cut-off of the current path.

Fifty (50) of each of batteries of the present embodiment and the comparative examples were prepared. A hole of 3 mm diameter was opened at the bottom of each battery casing 1 and a pipe for applying a predetermined pressure was inserted into the hole. Airtight sealing is applied between the pipe and the hole of the battery casing 1 using an O-ring so as to prevent leakage of the introduced gas into the casing 1. The number of the batteries which caused cut-off of the current path, i.e., breakdown of the conductive member 7, was examined for the inner pressure of the batteries at 23 C. The thin portion 5a of the pressure sensitive plate 5 was designed to be broken at an inner pressure of around 30 kgf/cm$^2$.

As shown in Table 1, the cut-off pressures of the comparative examples were distributed over a wide range of 6–25 kgf/cm$^2$ with a center value of 14–15 kgf/cm$^2$. On the other hand, over sixty (60) percent of the cut-off pressures measured for the batteries of the present embodiment fell within 14–15 kgf/cm$^2$ and all the measured pressures ranged between 12 and 17 kgf/cm$^2$. This result proves the high accuracy and superiority of the current cut-off function of the batteries of the present embodiment.

TABLE 1

| Cut-off pressure (kgf/cm$^2$) | Present embodiment | Comparative examples |
| --- | --- | --- |
| 6–7 | | 1 |
| 8–9 | | 4 |
| 10–11 | | 1 |
| 12–13 | 8 | 8 |
| 14–15 | 31 | 12 |
| 16–17 | 11 | 7 |
| 18–19 | | 9 |
| 20–21 | | 2 |

TABLE 1-continued

| Cut-off pressure (kgf/cm$^2$) | Present embodiment | Comparative examples |
| --- | --- | --- |
| 22–23 | | 5 |
| 24–25 | | 1 |

2. Material for the Fixing Plate 6

The material of the fixing plate 6 should be selected among substances which satisfy various conditions. The current cut-off function of the batteries should not be deteriorated after storage at approximately 80° C., exposure to the atmosphere of about 100° C. for a short period, or direct contact of the fixing plate 6 with an electrolyte. The fixing plate 6 should also be sufficiently rigid so as not to be deformed during a manufacturing process of the battery.

Considering the above conditions, one suitable material for the fixing plate 6 is a thermoplastic resin having heat resistance, corrosion resistance against the electrolyte, and high rigidity, such as polybutylene terephthalate, polyphenylene sulfide, and polytetrafluorethylene. Another suitable material is a thermosetting resin including epoxy resin and phenyl resin such as bakelite.

Furthermore, it is desirable that the material of the fixing plate 6 be a plastic material with a deflection temperature under load not less than 200° C. in addition to the above-mentioned conditions. More specifically, among such plastic materials are polybutylene terphthalate including 30 wt % glass fiber, polyphenylene sulfide containing 40 wt % glass fiber, and liquid crystal polymer having 30 wt % glass fiber. These kinds of materials provide secure cut-off characteristics for an increase of the inner pressure even when such misuse as an overcharge under very high temperature occurs. The deflection temperature under load is defined in ASTM D 468, indicating a temperature at which a specimen is deflected by a predetermined amount by a load of 1.82 MPa.

The primary reason for employing such materials for the fixing plate 6 is to prevent the plate 6 from becoming softer when the inner temperature of the battery becomes extremely high. If the fixing plate 6 is softened when both the inner temperature and the inner pressure of the battery become extremely high and the inner pressure reaches the predetermined current cut-off pressure, the fixing plate 6 including the conductive member 7 might be deformed along with expansion of the pressure sensitive plate 5 so that the conductive member 7 will not be broken around the weld joint 7c. This will result in accuracy of the current cut-off pressure becoming worsened since the current path will not be disconnected at the predetermined inner pressure of the battery.

To confirm the above, the cut-off pressure was measured at various temperatures for batteries of the present embodiment including the fixing plate 6 of materials having different deflection temperatures under load.

For measuring the current cut-off pressure, the batteries of the present embodiment without the electricity generating unit were prepared. Each of the batteries was provided with a cover unit at the open portion of the casing 1. At the bottom portion of the casing 1 there was formed a communicating hole of 3 mm diameter.

Ten (10) sample batteries of the above structure were prepared for each of the different materials for the fixing plate 6. The cut-off pressures of the batteries was measured for respective ambient temperatures of 20° C., 45° C., 60° C., and 100° C. in the same manner as that used in the tests of the cut-off pressure characteristics. The sample batteries were left in the thermostatic chamber of the above ambient temperatures for a predetermined period of time to make the temperature of the fixing plate 6 equivalent to that in the chamber. It should be noted that the preferable cut-off pressure ranges between 14 and 18 kgf/cm$^2$. The results of such test is shown in Table 2.

TABLE 2 (1/2)

| Ambient temperature (°C.) | Material of the fixing plate | Deflection temperature under load (°C.) | Measured cut-off pressure (kgf/cm$^2$) | |
|---|---|---|---|---|
| | | | Mean value | Standard deviation |
| 20 | polypropylene | 95 | 14 | 1.2 |
| | polybutylene terphthalate | 110 | 15 | 1.4 |
| | polybutylene terphthalate including 30 wt % glass fiber | 212 | 14 | 1.2 |
| | polyphenylene sulfide containing 40 wt % glass fiber | 270 | 14 | 1.1 |
| | liquid crystal polymer having 30 wt % glass fiber | 230 | 14 | 1.2 |
| 45 | polypropylene | 95 | 20 | 5.2 |
| | polybutylene terphthalate | 110 | 18 | 5.0 |
| | polybutylene terphthalate including 30 wt % glass fiber | 212 | 15 | 1.2 |
| | polyphenylene sulfide containing 40 wt % glass fiber | 270 | 15 | 1.1 |
| | liquid crystal polymer having 30 wt % glass fiber | 230 | 14 | 1.0 |

TABLE 2 (2/2)

| Ambient temperature (°C.) | Material of the fixing plate | Deflection temperature under load (°C.) | Measured cut-off pressure (kgf/cm$^2$) | |
|---|---|---|---|---|
| | | | Mean value | Standard deviation |
| 60 | polypropylene | 95 | Not activated | Not activated |
| | polybutylene terphthalate | 110 | Not activated | Not activated |
| | polybutylene terphthalate including 30 wt % glass fiber | 212 | 14 | 1.3 |
| | polyphenylene sulfide containing 40 wt % glass fiber | 270 | 15 | 1.2 |
| | liquid crystal polymer having 30 wt % glass fiber | 230 | 14 | 1.0 |
| 100 | polypropylene | 95 | Not activated | Not activated |
| | polybutylene terphthalate | 110 | Not activated | Not activated |
| | polybutylene terphthalate including 30 wt % glass fiber | 212 | 18 | 2.2 |
| | polyphenylene sulfide containing 40 wt % glass fiber | 270 | 14 | 1.3 |
| | liquid crystal polymer having 30 wt % glass fiber | 230 | 16 | 1.8 |

As shown in Table 2, the current path cut-off function of all the sample batteries was activated at an average value of 14–15 kgf/cm$^2$ of the inner pressure. The current path cut-off pressure measured for all the sample batteries having the fixing plate 6 of a deflection temperature under load of not less than 200° C. was 14 kgf/cm$^2$ and the standard deviation was 1.1 or 1.2.

At the ambient temperature of 45° C., the measured cut-off pressure of the sample battery including a polypropylene fixing plate of the deflection temperature under load less than 200° C. was 20 kgf/cm$^2$ beyond the preferable range. The standard deviation of the measured cut-off pressure values was a relatively large value of 5.2. The measured cut-off pressure of the sample battery having a polybutylene terphthalate fixing plate of the deflection temperature under load less than 200° C. was 18 kgf/cm$^2$ at the upper limit of the preferable range. The standard deviation of the measured cut-off pressure values was also a relatively large value of 5.0. On the other hand, the measured cut-off pressure of the sample battery having a fixing plate of the deflection temperature under load not less than 200° C. was 14–15 kgf/cm$^2$ and the standard deviation of the measured cut-off pressure values was 1.0–1.2.

At the ambient temperature of 60° C., the current path cut-off function of the sample battery including a fixing plate of the deflection temperature under load less than 200° C. was not activated. This is because the fixing plate 6 seemed to become so soft at approximately 60° C. that the fixing plate 6 including the conductive member 7 deformed along with expansion of the pressure sensitive plate 5 and the destruction of the conductive member 7 around the weld joint 7c did not occur. On the other hand, the measured cut-off pressure of the sample battery having a fixing plate of the deflection temperature under load not less than 200° C. was 14–15 kgf/cm$^2$ and the standard deviation of the measured cut-off pressure values was 1.0–1.3.

At the ambient temperature of 100° C., as seen in the cases of 60° C., the current path cut-off function of the sample battery including a fixing plate of the deflection temperature under load less than 200° C. was not activated. In contrast, the measured cut-off pressure of the sample battery having a fixing plate of the deflection temperature under load not less than 200° C. was within the preferable range of 14–18 kgf/cm$^2$ and the standard deviation of the measured cut-off pressure values was not more than 2.2. The sample batteries having fixing plates 6 of polyphenylene sulfide containing 40 wt % glass fiber demonstrated particularly good performance of the low cut-off pressure of 14 kgf/cm$^2$ and a standard deviation of approximately 1.3.

As a result of the above tests, the fixing plate 6 of plastic material with the deflection temperature under load not less than 200° C. provides secure and accurate current path cut-off performance for an extreme increase of the inner pressure at a high ambient temperature.

Figure 5:
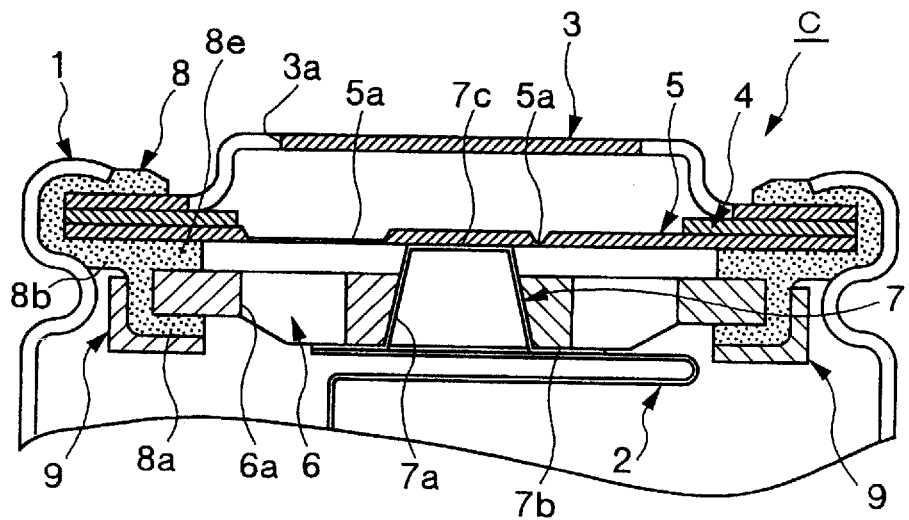
FIG. 5 is a partial cross-sectional view of the explosion-proof battery according to another embodiment of the present invention.
Figure 6:
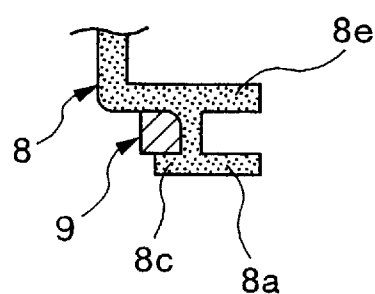
FIGS. 6(a) and 6(b) are partial cross-sectional views of a gasket assembly according to further embodiments of the present invention.
Figure 6:
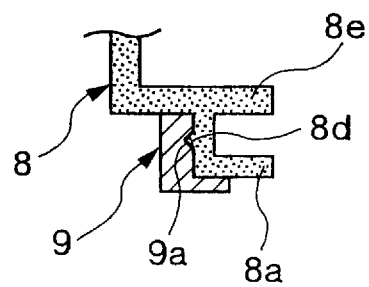

Another embodiment of the present invention is shown in FIGS. 5, 6(a), and 6(b). The difference between the present embodiment and the first embodiment is that the battery of the present embodiment comprises a retaining ring 9. The retaining ring 9 is fit onto the outer periphery of the lower end portion of the gasket 8. The lower peripheral portion of the gasket 8 is pressed against the outer peripheral portion of the fixing plate 6.

Each component of the cover unit in the battery of the present embodiment has the same function as those of the first embodiment, and the explosion-proof function was performed in the same manner. In the present embodiment, the retaining ring 9 prevents the fixing plate 6 from separation from the gasket 8 and damaging the weld joint 7c of the conductive member 7 upon unexpected vibration or impact being applied thereto.

The cross section of the retaining ring 9 may be varied as shown in FIGS. 5, 6(a), and 6(b). The retaining ring 9 in FIG. 5 has a substantially L-shaped cross section. In FIG. 6(a), the ring 9 has a rectangular cross section and is fit into a circumferential groove above an outward projecting portion 8c formed at the outer periphery of the lower end portion of the gasket 8. In FIG. 6(b), a ridge 8d is formed on the outer surface of the outer peripheral portion of the lower end of the gasket 8. A groove 9a provided in the retaining ring 9 is snapped onto the ridge 8d of the gasket 8. Other modifications of the gasket 8 and the retaining ring 9 than illustrated above are obviously possible.

The gasket 8 of the present embodiment includes an inwardly projecting ring portion 8e for retaining the outer peripheral portion of the fixing plate 6 with the projecting portion 8a as shown in FIG. 5 so as to firmly hold the fixing plate 6. In this embodiment, the projecting portion 7a of the conductive member 7 is protruded above the upper surface of the fixing plate 6 by the thickness of the projecting ring portion 8e and is welded to the lower surface of the pressure sensitive plate 5. The conductive member 7 is inserted into the fixing plate 6 in a hole formed at the central portion thereof. Alternatively, the conductive member 7 may be molded in the fixing plate 6 integrally as in FIG. 1.

Figure 7:
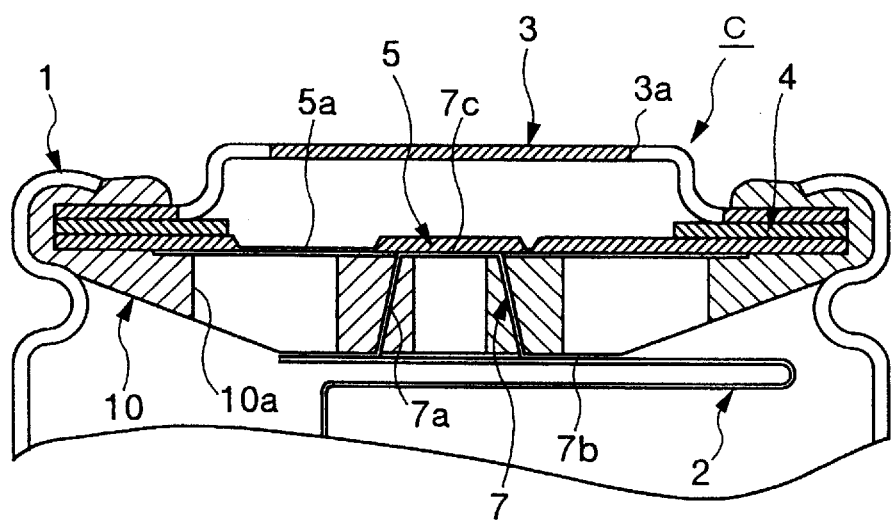
FIG. 7 is a partial cross-sectional view of the explosion-proof battery according to yet another embodiment of the present invention.

Yet another embodiment of the present invention is shown in FIG. 7. The battery of this embodiment comprises a gasket plate 10 corresponding to an integral combination of the fixing plate 6 and the gasket 8 of the first and second embodiments. This construction enables cost reduction due to a decrease of the number of components and improvement in efficiency of assembly.

To confirm an explosion-proof function of the battery of the present embodiment, the current cut-off characteristics were tested for the inner pressure of the battery casing as conducted for the first embodiment. The thin portion 5a of the pressure sensitive plate 5 was designed to be broken at an inner pressure around 30 kgf/cm$^2$.

TABLE 3

| Cut-off pressure (kgf/cm$^2$) | Present embodiment | Comparative examples |
|---|---|---|
| 6–7 | | 1 |
| 8–9 | | 4 |
| 10–11 | | 1 |
| 12–13 | 10 | 8 |
| 14–15 | 26 | 12 |
| 16–17 | 14 | 7 |
| 18–19 | | 9 |
| 20–21 | | 2 |
| 22–23 | | 5 |
| 24–25 | | 1 |

As shown in Table 3, the cut-off pressures of the comparative examples were distributed over a wide range of 6–25 kgf/cm$^2$ with a center value of 14–15 kgf/cm$^2$. On the other hand, over fifty (50) percent of the cut-off pressures measured for the batteries of the present embodiment fell within 14–15 kgf/cm$^2$ and all the measured pressure ranged between 12 and 17 kgf/cm$^2$. This result proves the high accuracy and superiority of the current cut-off function of the batteries of the present embodiment.

As mentioned regarding the fixing plate 6 of the first embodiment, it is also preferable that the material of the gasket plate 10 be a plastic material with a deflection temperature under load of not less than 200° C., such as polybutylene terephthalate including 30 wt % glass fiber, polyphenylene sulfide containing 40 wt % glass fiber, and liquid crystal polymer having 30 wt % glass fiber. This will prevent undesirable deformation of the gasket plate 10 when the inner pressure of the battery casing rises unusually in a high temperature atmosphere.

Figure 8:
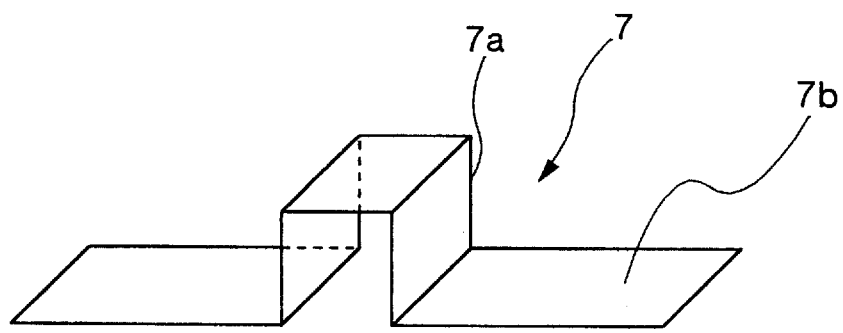
FIG. 8 is a perspective view of a metal terminal plate according to another embodiment of the present invention.
Figure 9:
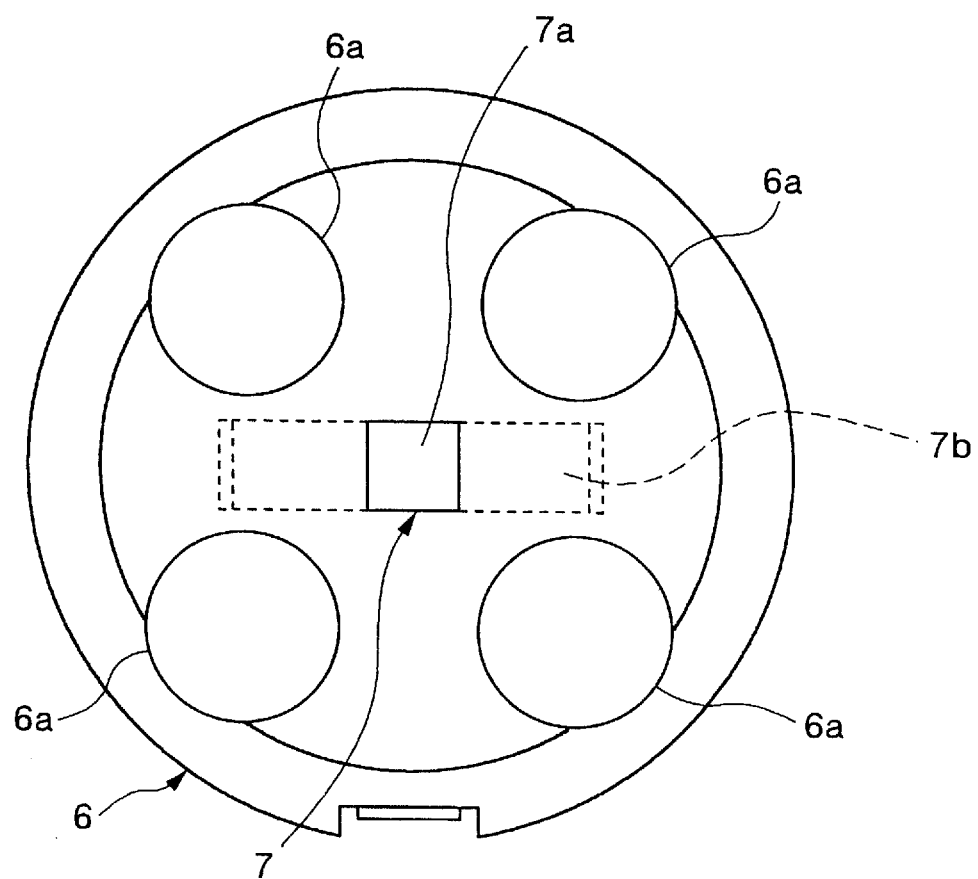
FIG. 9 is a top plan view of a fixing plate assembly according to another embodiment of the present invention.

FIGS. 8 and 9 show a further embodiment of the present invention employing a conductive member 7 formed of a long rectangular sheet. The rectangular sheet is bent to form a substantially U-shaped projecting portion 7a. In this case, since the conductive member 7 can be prepared by simple bending of the rectangular sheet, cost reduction of the conductive member 7 and improvement of productivity are achieved.

Figure 10:
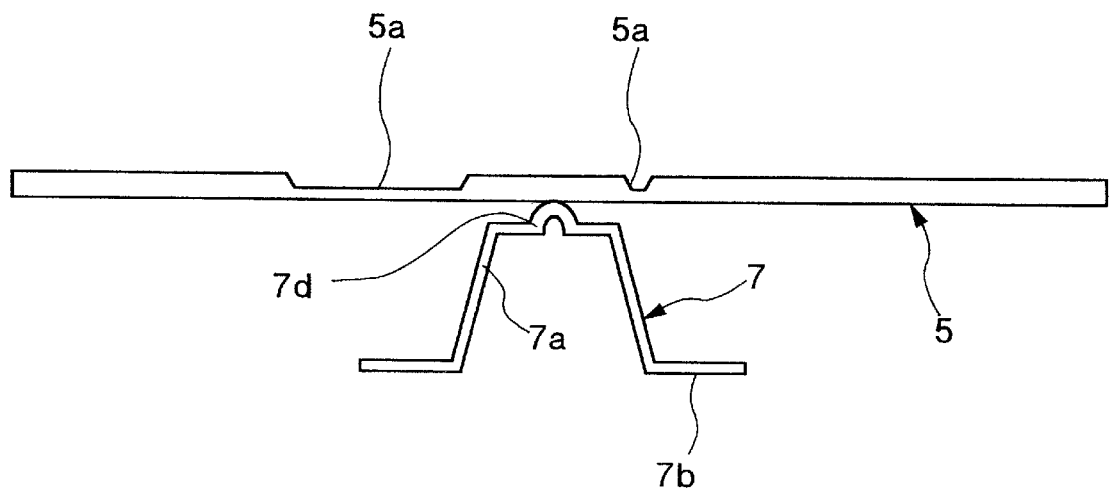
FIG. 10 is a cross-sectional view of a fixing plate and a electric conductive member according to yet another embodiment of the present invention.

The conductive member 7 of the yet another embodiment shown in FIG. 10 has a projection 7d on the upper surface of the projecting portion 7a thereof. The tip end of the projection 7d may be welded to the lower surface of the pressure sensitive plate 5 to form a weld joint 7c. The weld joint 7c between the projection 7d and the pressure sensitive plate 5 should be formed to have a sufficient strength as described in the above embodiments.

The cover unit C of the present invention may be applied to batteries having a rectangular cross section such as lithium secondary batteries. For this purpose, since the components included in the cover unit C are prepared to have rectangular cross section, production of the components may become simpler and cost reduction will be achieved. This also leads to a decrease in the proportion of defective components.

It should be understood that the invention is not limited to the particular embodiments shown and described herein, but that various changes and modifications may be made without departing from the spirit and scope of the invention as defined by the following claims.

What is claimed is:

1. An explosion-proof battery comprising:
   a hollow cylindrical casing having a closed bottom portion;
   an electricity generating unit installed in said casing;
   a lead tab connected to an electrode of said generating unit;
   a cover unit for covering an open portion of said casing, said cover unit being electrically connected to said lead tab;
   said cover unit including a rigid metal terminal plate, a pressure sensitive plate in the form of a flexible and vulnerable metal plate, a fixing plate of insulating material, an electrically conductive member including a base portion and a projecting portion projecting upwardly from said base portion, and a ring-shaped gasket of insulating material;
   said terminal plate and said fixing plate having respective vent holes;
   an upper surface of said projecting portion being disposed on an upper surface side of said fixing plate;
   a lower surface of said base portion being disposed at a lower surface side of said fixing plate;
   said ring-shaped gasket being inserted into an inner peripheral portion of said open portion of said casing;
   said fixing plate being fit into an inner periphery of said gasket;
   said pressure sensitive plate and said terminal plate being placed on said fixing plate in order;
   said electrically conductive member and said pressure sensitive plate being connected each other at a connecting portion of said projecting portion of said conductive member;
   a tip end portion of said lead tab being connected to said base portion of said conductive member; and
   said open portion of said casing being deformed inwardly in a radial direction of a cross section of the casing to compress said gasket to seal said casing with said cover unit;

whereby outward expansion of said pressure sensitive plate will cause said conductive member to break in the vicinity of said connecting portion thereby to cut off a current path between said lead tab and said terminal plate when a pressure in said casing reaches a predetermined value.

2. An explosion-proof battery as set forth in claim 1, wherein said conductive member is integrally arranged in said fixing plate.

3. An explosion-proof battery as set forth in claim 2, wherein a retaining ring is disposed along an outer periphery of said gasket so that a lower end peripheral portion of said gasket is pressed to said fixing plate by said retaining ring.

4. An explosion-proof battery as set forth in claim 2, wherein said fixing plate is formed of plastic material having a deflection temperature under load of not less than 200° C.

5. An explosion-proof battery as set forth in claim 1, wherein a retaining ring is disposed along an outer periphery of said gasket so that a lower end peripheral portion of said gasket is pressed to said fixing plate by said retaining ring.

6. An explosion-proof battery as set forth in claim 5, wherein said fixing plate is formed of plastic material having a deflection temperature under load of not less than 200° C.

7. An explosion-proof battery as set forth in claim 1, wherein said projecting portion of said conductive member is formed in a shape of a truncated cone.

8. An explosion-proof battery as set forth in claim 1, wherein said projecting portion of said conductive member is defined as a U-shaped folded portion.

9. An explosion-proof battery as set forth in claim 1, wherein said fixing plate is formed of plastic material having a deflection temperature under load of not less than 200° C.

10. An explosion-proof battery comprising:

a hollow cylindrical casing having a closed bottom portion;

an electricity generating unit installed in said casing;

a lead tab connected to an electrode of said generating unit;

a cover unit for covering an open portion of said casing, said cover unit being electrically connected to said lead tab;

said cover unit including a rigid metal terminal plate, a pressure sensitive plate in the form of a flexible and vulnerable metal plate, an electrically conductive member including a base portion and a projecting portion projecting upwardly from said base portion, and a gasket plate of insulating material and having an upwardly extending outer peripheral portion;

said terminal plate and said gasket plate having respective vent holes;

an upper surface of said projecting portion being disposed on said upper surface side of said gasket plate;

a lower surface of the base portion being disposed at a lower surface side of said gasket plate;

said gasket plate being fit into an inner peripheral portion of said open portion of said casing;

said pressure sensitive plate and said terminal plate being placed on said gasket plate in order;

said electrically conductive member and said pressure sensitive plate being connected each other at a connecting portion of the projecting portion of said conductive member;

a tip end portion of said lead tab being connected to said base portion of said conductive member; and said open portion of said casing being deformed inwardly in a radial direction of a cross section of said casing to compress said gasket plate to seal said casing with said cover unit;

whereby outward expansion of said pressure sensitive plate will cause said conductive member to break in the vicinity of said connecting portion, thereby to cut off a current path between said lead tab and said terminal plate when a pressure in said casing reaches a predetermined value.

11. An explosion-proof battery as set forth in claim 10, wherein said conductive member is integrally arranged in said gasket plate.

12. An explosion-proof battery as set forth in claim 11, wherein said gasket plate is formed of plastic material having a deflection temperature under load of not less than 200° C.

13. An explosion-proof battery as set forth in claim 10, wherein said gasket plate is formed of plastic material having a deflection temperature under load of not less than 200° C.

* * * * *